United States Patent
Nguyen (12) United States Patent (10) Patent No.: US 10,643,484 B2
(45) Date of Patent: May 5, 2020

(54) CAPACITIVE GESTURE RECOGNITION BOOK

(71) Applicant: HALLMARK CARDS, INCORPORATED, Kansas City, MO (US)

(72) Inventor: Mathew Long Nguyen, Kansas City, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

(21) Appl. No.: 14/516,132

(22) Filed: Oct. 16, 2014

(65) Prior Publication Data

US 2016/0109976 A1 Apr. 21, 2016

(51) Int. Cl.
*G09B 5/06* (2006.01)
*G06F 15/02* (2006.01)

(52) U.S. Cl.
CPC ......... *G09B 5/062* (2013.01); *G06F 15/0291* (2013.01)

(58) Field of Classification Search
None
See application file for complete search history.

(56) References Cited

U.S. PATENT DOCUMENTS

| | | | | |
|---|---|---|---|---|
| 5,356,296 A | * | 10/1994 | Pierce | A63H 33/38 434/317 |
| 5,484,292 A | * | 1/1996 | McTaggart | B42C 9/00 345/901 |
| 5,645,432 A | * | 7/1997 | Jessop | A63F 3/00643 434/308 |
| 5,810,604 A | * | 9/1998 | Kopp, Jr. | G09B 5/062 200/5 A |
| 8,729,379 B2 | | 5/2014 | Wallace et al. | |
| 2005/0266386 A1 | * | 12/2005 | Marggraff | G09B 5/062 434/317 |

(Continued)

FOREIGN PATENT DOCUMENTS

CA 2887652 A1 4/2017

OTHER PUBLICATIONS

Canadian Examiner's Report dated Sep. 28, 2016 in Canadian Patent Application No. 2,897,300, 7 Pages.

(Continued)

*Primary Examiner* — Matthew Yeung
(74) *Attorney, Agent, or Firm* — Shook, Hardy & Bacon L.L.P.

(57) ABSTRACT

A capacitive gesture recognition book includes a plurality of capacitive sensors concealed in a base cover of the book. The capacitive sensors detect changes in capacitance brought on by a finger of a user coming in proximity with the capacitive sensor. A processor located in the base cover includes a plurality of capacitive activation sequences and a plurality of corresponding responses stored therein. Upon detection of a stored capacitive activation sequence, the processor initiates activation of the corresponding response which may be playback of an audio file. The book includes a plurality of pages that contain graphics and/or words for a storyline. The graphics can include images intended to direct a user of a desired motion to be made that corresponds with activation of sensors in a manner stored as a capacitive activation sequence.

20 Claims, 9 Drawing Sheets

(56) References Cited

U.S. PATENT DOCUMENTS

| | | | |
|---|---|---|---|
| 2010/0328264 A1* | 12/2010 | Yip | G06F 15/0283 |
| | | | 345/174 |
| 2011/0205184 A1 | 8/2011 | Tam et al. | |
| 2011/0239155 A1* | 9/2011 | Christie | G06F 3/044 |
| | | | 715/784 |
| 2013/0021281 A1* | 1/2013 | Tse | G06F 3/0425 |
| | | | 345/173 |
| 2013/0084266 A1 | 4/2013 | Ott et al. | |
| 2013/0118338 A1 | 5/2013 | Wallace et al. | |
| 2013/0194223 A1* | 8/2013 | Ward | G06F 1/3262 |
| | | | 345/174 |
| 2013/0316321 A1 | 11/2013 | Herz | |
| 2014/0060290 A1 | 3/2014 | Wallace et al. | |
| 2014/0082466 A1 | 3/2014 | Heo | |
| 2015/0205425 A1* | 7/2015 | Kuscher | G06F 3/04883 |
| | | | 345/173 |

OTHER PUBLICATIONS

Canadian Office Action dated Jul. 18, 2017 for Canadian Patent Application No. 2,897,300, 7 pages.
Examiner's Report dated Jun. 18, 2019 in Canadian Patent Application No. 2,897,300, 3 pages.
Office Action dated Jul. 3, 2018 in Canadian Patent Application No. 2,897,300, 7 pages.

* cited by examiner

CAPACITIVE GESTURE RECOGNITION BOOK

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates generally to an interactive storybook and, more particularly, to a book having an array of capacitive sensors to detect motion on or near the book by a user to activate audio playback of sounds associated with the detected motion and which accompany one or more images on the book.

BACKGROUND

Audio storybooks are known in the art. They typically have multiple pages with artwork and writing thereon. The rear cover of the book is generally wider than the front cover and the pages to provide an extended portion upon which an audio playback device is located. The housing of the audio playback device generally includes a number of buttons thereon with images or icons thereon that correspond with similar images/icons on the pages of the book. The user, while reading the story, comes to a point in the story where the image/icon occurs and they push the corresponding button to play a sound appropriate for that moment in the story. In these arrangements, the user can see the buttons and is well aware that they are pushing a button. As a result, the user is not surprised when audio is played.

SUMMARY

This summary is provided to introduce a selection of concepts in a simplified form that are further described below in the Detailed Description. This summary is being provided to meet statutory requirements and is not intended to identify key features or essential features of the claimed subject matter, nor is it intended to be used as an aid in determining the scope of the claimed subject matter.

Embodiments of the present invention are directed to a capacitive gesture recognition book. The capacitive gesture recognition book includes a book base having one or more processors, one or more capacitive sensors coupled to at least one of the one or more processors, at least one power supply coupled to at least one of the one or more processors, and at least one output component coupled to at least one of the one or more processors. Additionally, the capacitive gesture recognition book includes at least one book page coupled to the book base, the at least one book page comprising at least one page feature, wherein the at least one page feature corresponds to at least one of the one or more capacitive sensors.

Further embodiments of the invention are directed to an interactive gesture recognition book. The interactive gesture recognition book includes a book base, a first book page coupled to the book base, and a processor associated with the first book page. In embodiments, the processor includes a detection component configured to receive at least one indication of change in capacitance based on monitoring by at least one capacitive sensor, a determining component configured to associate the at least one indication of change in capacitance with at least one touch sequence, and an output component configured to initiate a corresponding response associated with the at least one touch sequence.

An additional embodiment of the present invention provides a method for operating a capacitive gesture recognition book. The method includes receiving, at a first timepoint, an indication of a change in capacitance with respect to a first page surface of the capacitive gesture recognition book. The method further includes determining a first touch sequence associated with the received indication of a change in capacitance at the first timepoint. Additionally, the method includes initiating a response corresponding to the determined first touch sequence, wherein the initiated response comprises playing of at least a portion of a first audible recording.

BRIEF DESCRIPTION OF THE SEVERAL VIEWS OF THE DRAWINGS

The present invention is explained in more detail with reference to the embodiment illustrated in the attached drawing figures, in which like reference numerals denote like elements. FIGS. 1-11 illustrate one possible embodiment of the present invention, in which:

DETAILED DESCRIPTION

Figure 1:
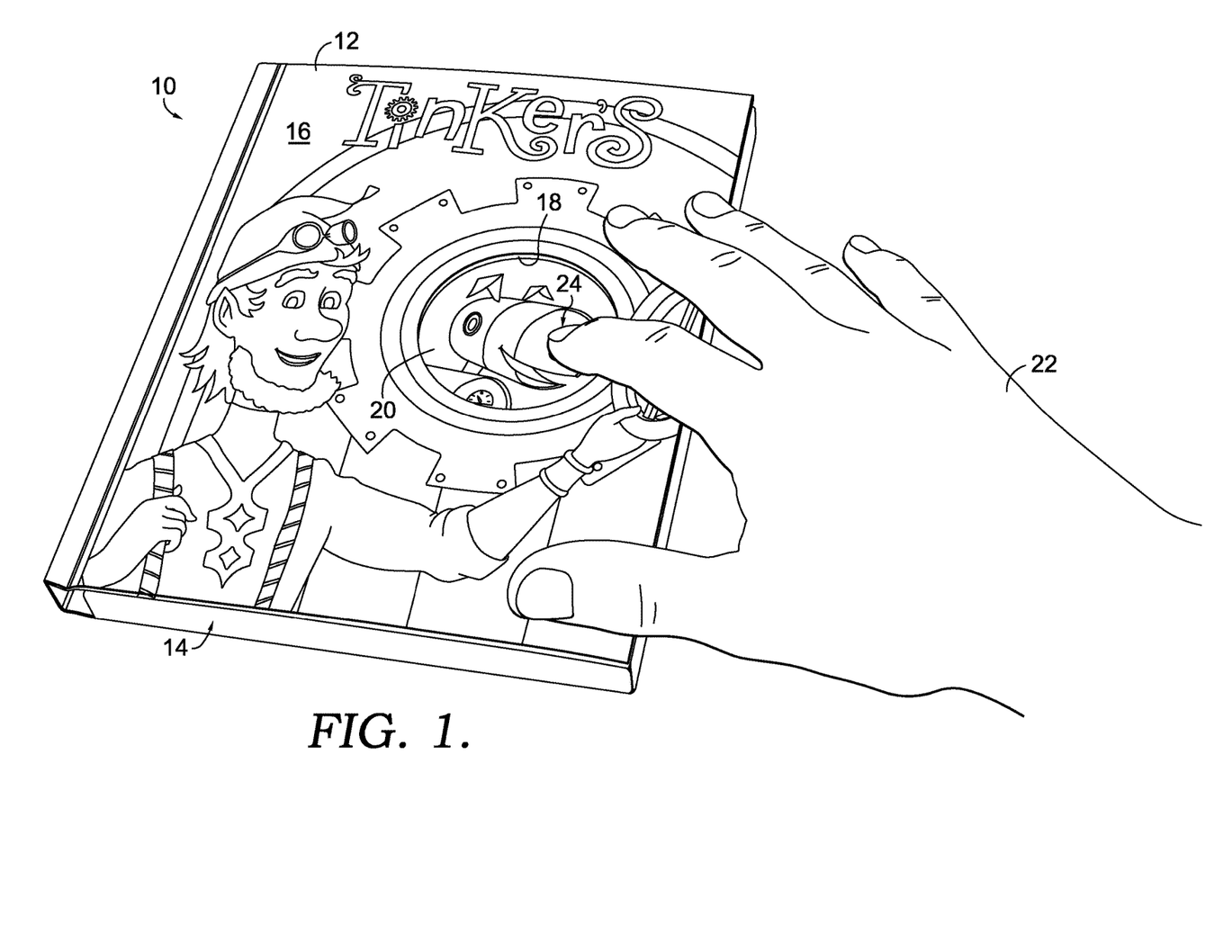
FIG. 1 is a front perspective view of a capacitive gesture recognition book in a closed position with a view of a front cover, in accordance with an embodiment of the present invention.

Referring now to the drawings in more detail, wherein like reference characters designate like parts throughout the different views, FIG. 1 provides a front perspective view of an illustrative embodiment of a capacitive gesture recognition book 10, having a front book cover 12, a book base 14, and a book cover surface 16 with a cutout 18 through which a first interior book page 20 may be viewed and/or contacted by a user 22. In one aspect of the invention, a user 22 may contact the first book page 20 at a contact point 24 when the book 10 is in a closed position by sticking their finger through the cutout 18 in the book cover surface 16 of the front book cover 12, to interact with one or more page features of the first book page 20. In response to such user 22 interaction at the contact point 24, a corresponding output may be initiated by one or more components of the capacitive gesture recognition book 10, such as a sound played by a speaker.

Figure 2:
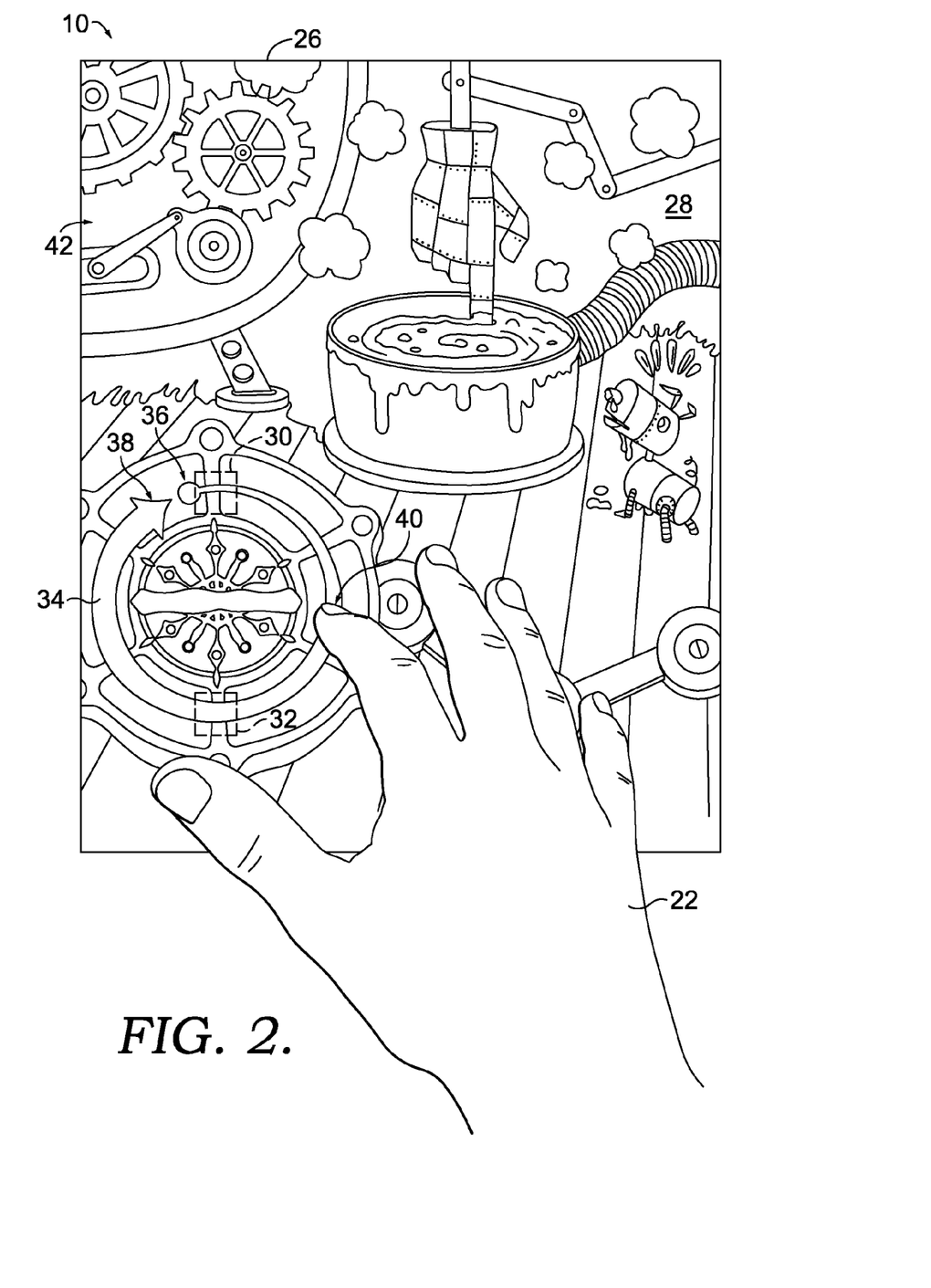
FIG. 2 is a top plan view of a user interacting with a first interior book page of the capacitive gesture recognition book, in accordance with an embodiment of the present invention.

Various page features may be located throughout multiple pages of the capacitive gesture recognition book 10 for eliciting user interaction in such a proximity to the book that a change in capacitance may be detected. As such, one or more contact points identified with respect to a particular page feature may be indicated in the content of a page's top surface. As shown in the example of FIG. 2, a top view of a user 22 interacting with a second interior book page 26 of the capacitive gesture recognition book 10 includes one or more instances of contact or near contact with a page top surface 28 of the second book page 26. FIG. 2 includes hidden lines representing a first capacitive sensor 30 and a second capacitive sensor 32 that are positioned below the page top surface 28 of the second book page 26. In particular, a contact indicator 34 (e.g., a graphic representation of a dial feature on the page) may include a starting point 36 and a stopping point 38 that direct a particular pattern and/or touch sequence that the user should follow during interaction with page content 42 on the second book page 26. Accordingly, at contact point 40 (between the user 22 and the page top surface 28), a user may first contact the first capacitive sensor 30 at a starting point 36, and follow the dial feature around a curve to reach the second capacitive sensor 32, while continuing in a circular motion to reach the stopping point 38 at the end if the circular dial feature or continue on in the same circular motion, repeatedly activating first capacitive sensor 30 and second capacitive sensor 32 in the same order to continue getting audio output for as long as the sensors 30, 32 are being activated. It should be noted that, as used herein, it is to be understood that the user 22 does not actually physically come in contact with one of the capacitive sensors, as they are contained within the book base and are hidden behind at least a rearmost interior page 64 and, often, one or more additional interior pages. For that matter, the user 22 does not even need to contact the page to which the book 10 is open to activate the audio. The capacitive sensors can detect change in capacitance not only through the pages but through an amount of space between the user 22 and the book page. However, in most instances, the user 22 will actually slide their finger along the book page during interaction with and operation of the book 10. Nonetheless, for simplicity sake, the interaction will be described in connection with contact with the page and contact points. Also, while activation or detection is described herein with reference to a user's finger for simplicity sake, other items that could trigger a detected change in capacitance by the capacitive sensors may be used. For example, and not in a limiting sense, one could use other capacitive objects, such as a pen with a capacitive tip, a toy (e.g., a car) made from a capacitive plastic or having a capacitive paint thereon, an object with capacitive ink or fabric, etc.

While following such path of contact, the finger of the user 22, as it nears and then moves away from the capacitive sensors 30, 32, may result in or provide an indication of a change in capacitance associated with both the first capacitive sensor 30 at a first point in time, and a second capacitive sensor 32 at a second point in time. In some embodiments, such an ordering of sequential "contact" with a series of specific capacitive sensors may be referred to as a "touch" sequence for a particular page, such as a first touch sequence associated with a sequential change in capacitance detected by first capacitive sensor 30 and second capacitive sensor 32. In some aspects, a touch sequence for a particular page corresponds to one or more actions and/or story elements associated with page content on a particular page. As an example only, the user's 22 clockwise circular motion of their finger on or above the arrow 34 on the page surface 28 results in detected sequential changes in capacitance by sensors 32 and 32 and causes audio of a stifling sound to be played so long as the user 22 keeps moving their finger in the path of the arrow 34.

Additionally, such sequential contact may occur within a specific threshold amount of time, such as a maximum or minimum duration between the initial contact and the final movement. In some embodiments of the invention, a user may elicit a corresponding response by the capacitive gesture recognition book 10 in response to such contact, as further discussed below.

Figure 3:
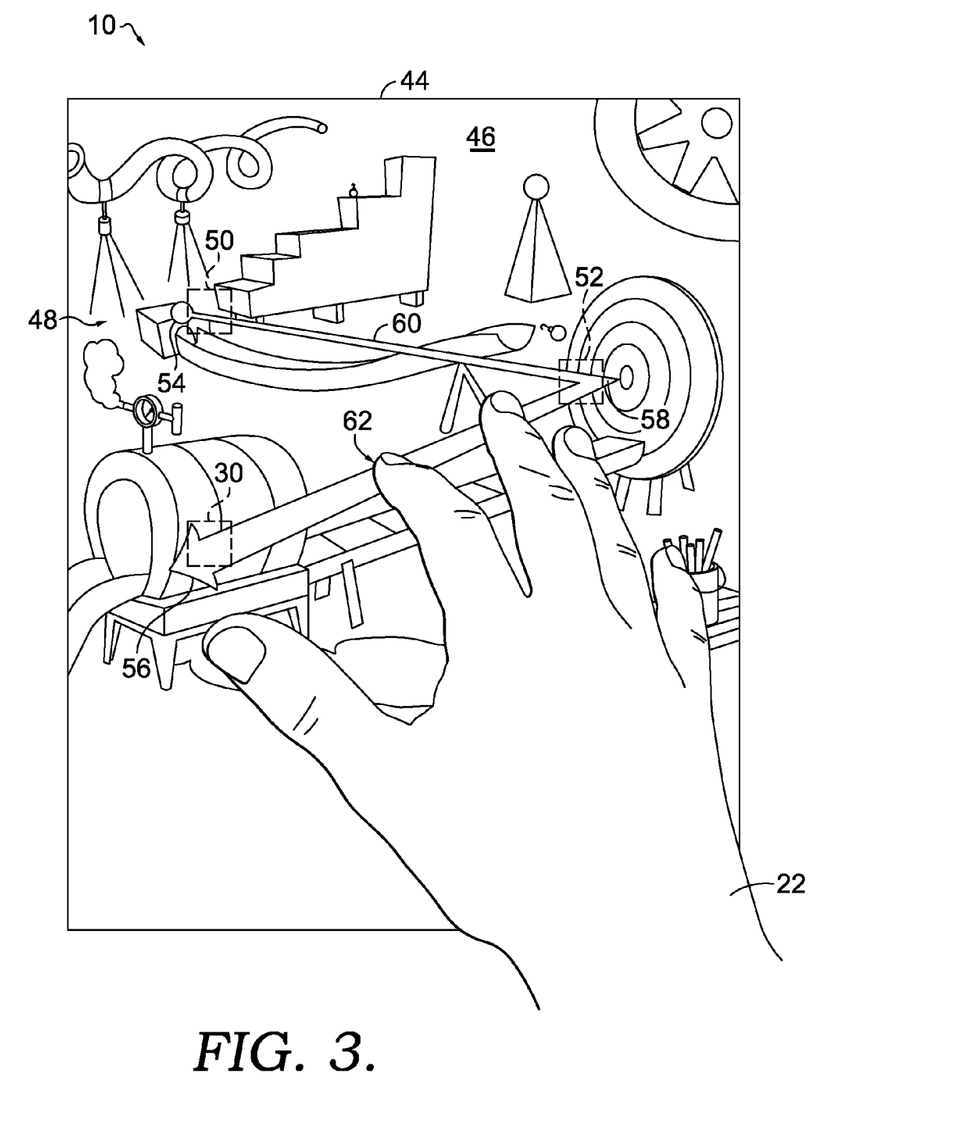
FIG. 3 is a top plan view of a user interacting with a second interior book page of the capacitive gesture recognition book, in accordance with an embodiment of the present invention.
Figure 6:
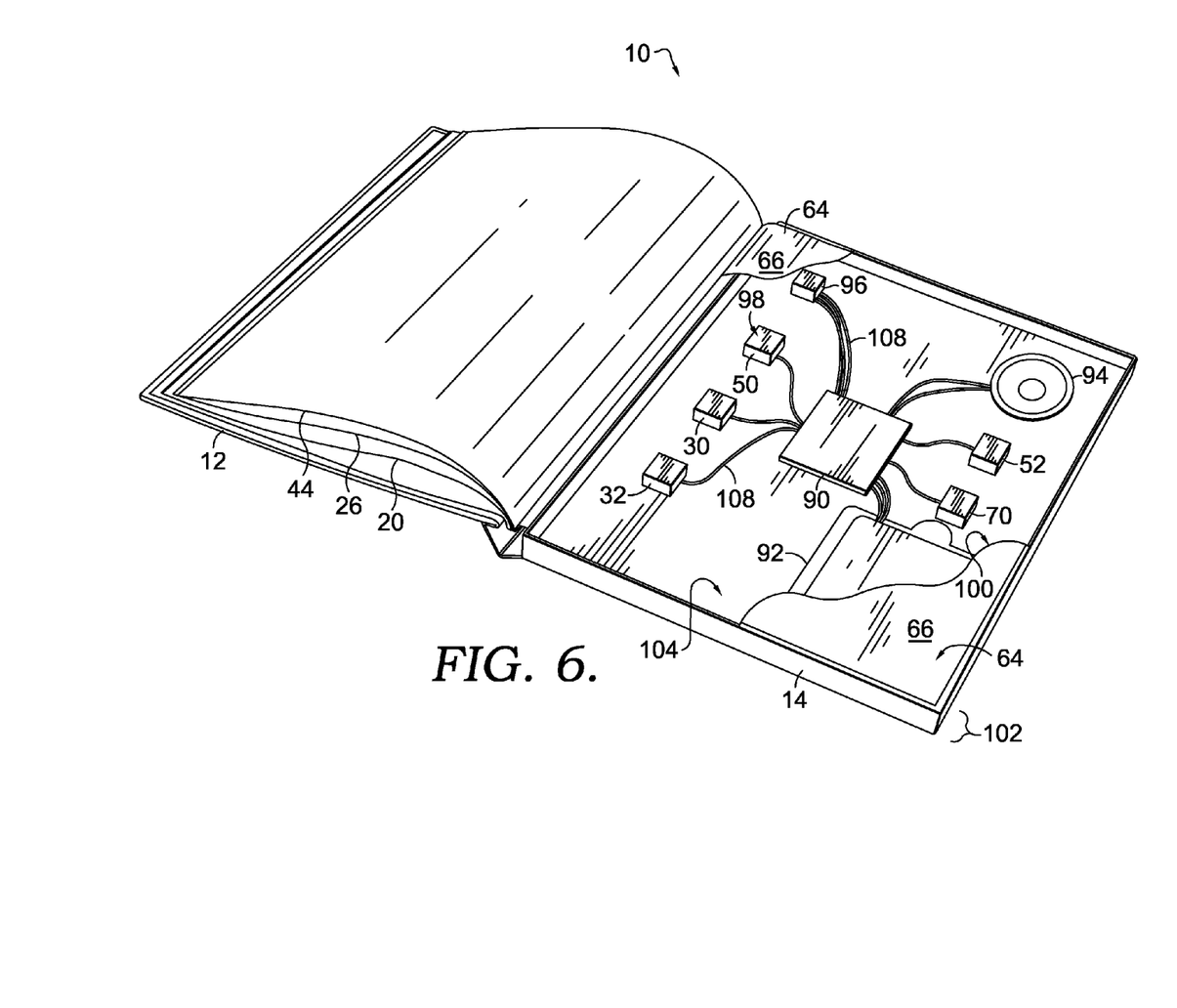
FIG. 6 is a front perspective view of the capacitive gesture recognition book with a portion of a back page of the book cut-away to reveal components inside a base of the book, in accordance with an embodiment of the present invention.

In the example of FIG. 3, a top plan view of a user 22 interacting with a third interior book page 44 of the capacitive gesture recognition book 10 positioned above the book base 14 is disclosed, in accordance with an embodiment of the present invention. The exemplary third book page 44 includes a page top surface 46 with page content 48 for directing interaction with a third capacitive sensor 50, a fourth capacitive sensor 52, and the first capacitive sensor 30. In some aspects of the invention, each of the third, fourth and first capacitive sensors 50, 52, and 30 are positioned below the book page 44 such that contact with the page top surface 46 may be detected by each of the corresponding capacitive sensors. In one embodiment, a starting point 54 may be indicated as part of the page content 48, which directs the user 22 to contact the page top surface 46 at starting point 54 and begin following a contact indicator 60 pathway to a next feature on the book page 44. As such, a user 22 may manipulate the interaction at contact point 62 (between the user 22 and the page top surface 46) from the starting point 54 to an intermediate point 58, and on to a stopping point 56. Based on such manipulation, the third capacitive sensor 50, the fourth capacitive sensor 52, and the first capacitive sensor 30 may receive sequential indications of a change in capacitance. Further, the sequential indications of capacitance by the third, fourth, and first capacitive sensors 50, 52, and 30 may be associated with a particular audio file. Upon detection, by a processor or integrated circuit 90 (FIG. 6), of the sequential change of capacitance by the third, fourth, and first capacitive sensors 50, 52, and 30, the processor 90 causes the corresponding audio file to be played from memory through a speaker 94 (FIG. 6). By way of example only, the audio file may sound like a ball rolling down a metal chute, "boinging" off a target, and rolling down a wooden chute.

Figure 4:
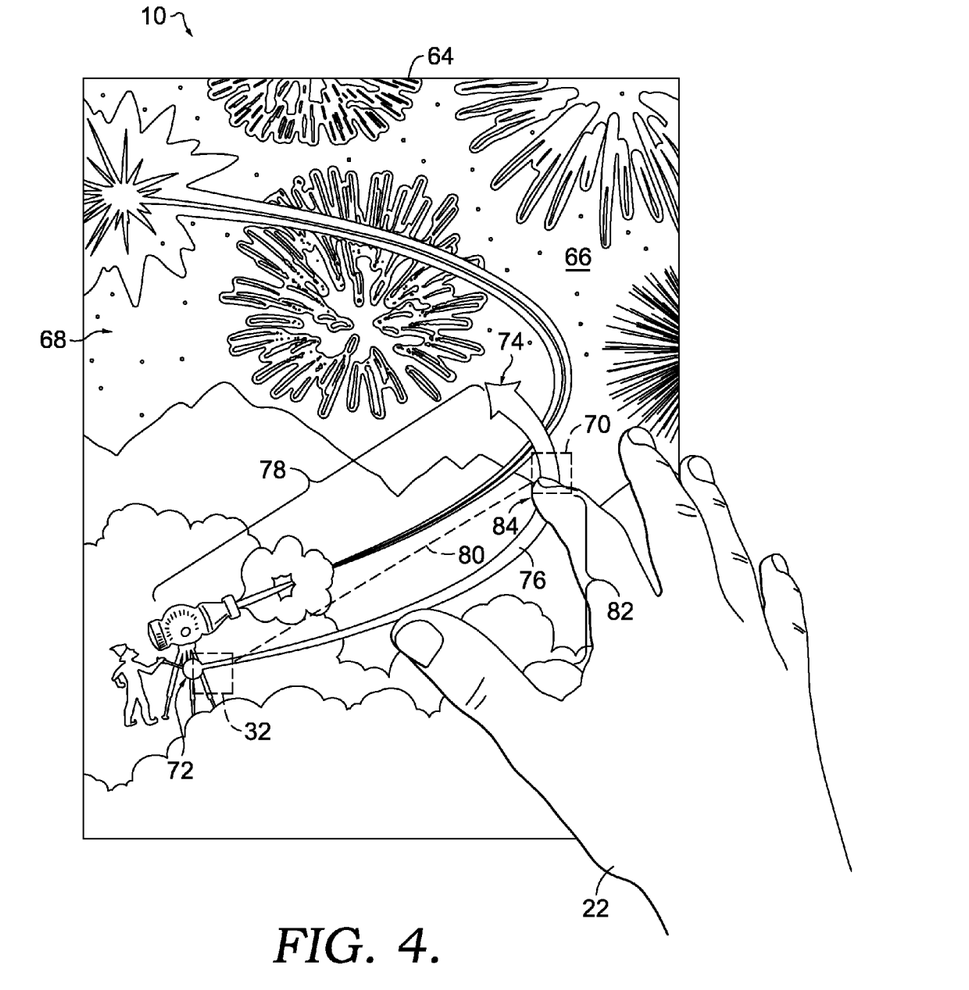
FIG. 4 is a top plan view of a user interacting with a third interior book page of the capacitive gesture recognition book, in accordance with an embodiment of the present invention.

Turning now to FIG. 4, a top plan view of a user 22 interacting with a fourth interior book page 64 of the capacitive gesture recognition book 10 positioned above the book base 14 is disclosed, in accordance with an embodiment of the present invention. The fourth book page 64 has a page top surface 66 with page content 68 thereon. The page content 68 includes a drawing of a figure shooting off fireworks into the sky. The page content 68 also includes a contact indicator 76 in the form of an arrow starting at a starting point 72 and ending at an arrow head or stopping point 74. When the user 22 places their finger on or above the starting point 72, the second capacitive sensor 32, which is positioned there under, detects a change in capacitance. As the user 22 moves their finger in the direction of the arrow/contact indicator 76, thereby changing a contact point 84, the user's 22 finger passes over a fifth capacitive sensor 70, which detects a change of capacitance. Accordingly, the contact indicator 76 represents a detection range 78. It should be noted that the detection range 78 in this embodiment only includes two capacitive sensors. Consequently, although the contact indicator 76 illustrates a curved path 82 that the user 22 is to take, movement by the user 22 along a direct path 80 would also result in a sequential activation of capacitive sensors 32 and 70 and, therefore, would also result in activation of an audio file associated with sequential activation of capacitive sensors 32 and 70. By way of example only, the audio file may sound like a small firework rocket taking of and then exploding.

Figure 5:
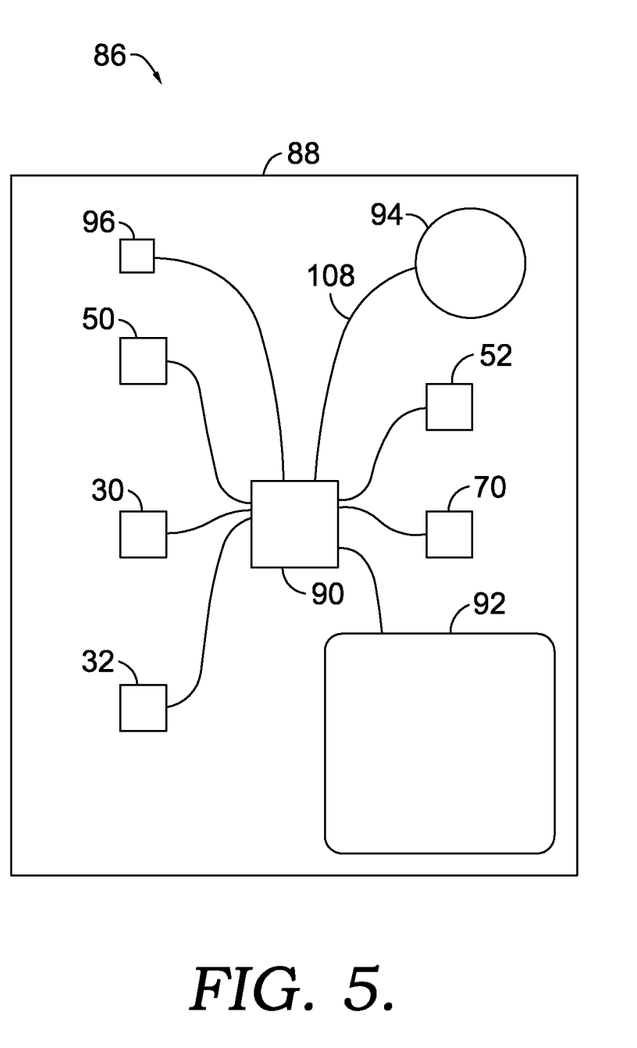
FIG. 5 is a schematic plan view of various components of the capacitive gesture recognition book, in accordance with an embodiment of the present invention.

FIG. 5 illustrates a schematic plan view or component diagram 86 of some of the components found in the book base content 88 of the capacitive gesture recognition book 10. The book base content 88 includes first, second, third, fourth and fifth capacitive sensors 30, 32, 50, 52, and 70, respectively. The capacitive sensors are all electronically coupled, such as by wires 108, with the integrated circuit 90 and a power source 92. The power source 92 may be, for example, batteries in a battery compartment. The speaker 94 is also electronically coupled with the processor 90.

In the illustrated embodiment, the book base content 88 also includes a Hall effect sensor 96. A magnet (not shown) is positioned in the front cover 12 at a position that overlies the Hall effect sensor 96 when the book 10 is in a closed position. The Hall effect sensor 96 detects the presence or absence of the magnet. When the magnet's presence is detected by the Hall effect sensor 96, the processor 90 knows the book 10 is in a closed position and may operate in a first mode. The first mode may be a trial mode to allow potential purchasers in a store to try out the capacitive touch recognition capabilities without being allowed to open the book 10, in the manner illustrated in FIG. 1. In that manner only the fifth capacitive sensor 70 is active, as it is the only one within the area defined by the cutout 18. Activation of the fifth capacitive sensor 70 in the first mode may play a first sound, which may be associated with the cover 12 or may be instructions or information about the book 10. The book 10 may also have a shut off timer in the first mode to prevent battery drain irrespective of the position of any on/off switch 130.

When the Hall effect sensor 96 does not detect the presence of the magnet, the processor 90 knows the book 10 is in an open position and may operate in a second mode. In the second mode all of the capacitive sensors may be activated. Optionally, activation of only the fifth capacitive sensor 70 in the second mode may play a second sound, which may be associated with one of the pages in the book 10, such as first page 20.

In an alternate embodiment, the Hall effect sensor 96 may act as a trigger or reset for the capacitive sensors 30, 32, 50, 52, and 70. When the book 10 is powered on in the closed position by the on/off switch 130, the capacitive sensors all calibrate to a zero value. All of the capacitive sensors would therefore be active, but all of the ones covered by the thick cover would not detect user movement that occurs outside the book through the cover. The fifth capacitive sensor 70, which is within the cutout 18 area, would be able to detect movement. When the book 10 is opened, the Hall effect sensor 96 detects the removal of the presence of the magnet and causes all of the capacitive sensors to be reactivated, thereby recalibrating to a zero value with the cover 12 open. The Hall effect sensor 96 could be replaced with an alternate method of determining the open/closed status of the book (e.g., a slide switch, a light detector, calibrations of the capacitive sensors themselves, etc.).

FIG. 6 illustrates the book 10 open to the last page, which in this embodiment is the fourth page 66. A portion of the fourth page 66 is cut away to reveal the components inside the base 14 of the capacitive gesture recognition book 10. The capacitive sensors include a sensing surface 98 positioned below and adjacent a page bottom surface 100. The base 14 preferably has a depth dimension 102 sufficient to define a compartment 104 deep enough to contain the sensors and other electrical components.

Figure 7:
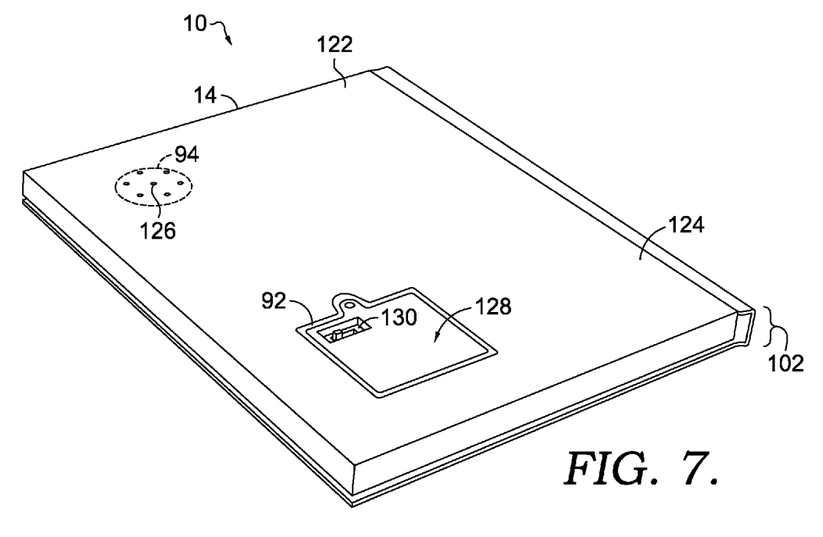
FIG. 7 is a back perspective view of the capacitive gesture recognition book in a closed position, in accordance with an embodiment of the present invention.

FIG. 7 illustrates a rear of the capacitive gesture recognition book 10. The book includes a back cover 122 having a rear surface 124 into which a plurality of apertures 126 are formed to allow sound from the speaker 94 to pass unobstructed. A battery access door 128 may be provided in the back cover 122 to allow users to replace dead batteries. The on/off switch 130 may be located in the battery compartment and accessible through the access door 128.

Figure 8:
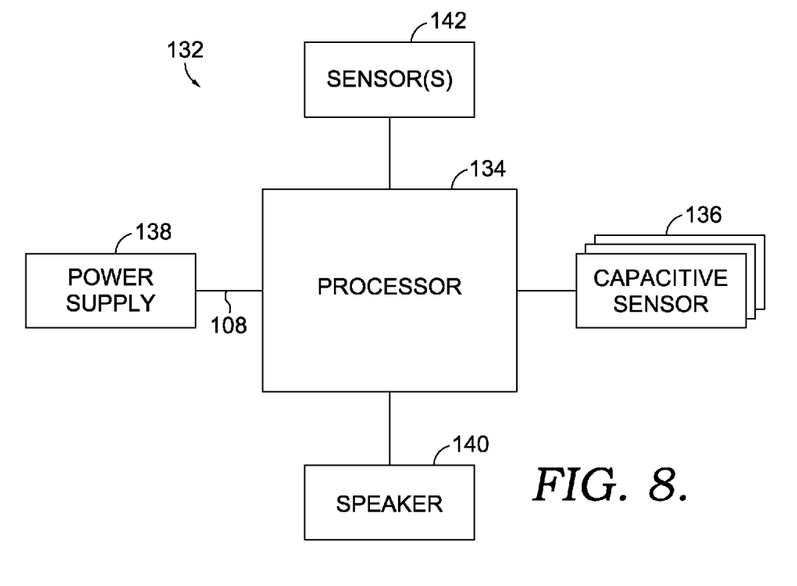
FIG. 8 is a system diagram of components of a capacitive gesture recognition book, in accordance with an embodiment of the present invention.

FIG. 8 is a schematic diagram of exemplar electronic components 132 for use with the capacitive gesture recognition book 10. A processor 134 is electronically coupled with capacitive sensors 136, a power supply 138, a speaker 140, and a sensor 142. The capacitive sensors 136 detect changes in capacitance and inform the processor 134 of the same. The processor includes a memory component which has capacitive sensor activation sequences and audio files stored therein. The audio files are associated with particular capacitive sensor activation sequences. When the processor 134 determines that capacitive sensors 136 were activated in a stored capacitive sensor activation sequence, the processor initiates playback of the audio file associated with the stored capacitive sensor activation sequence and the audio file is played via the speaker 140. In an embodiment, the sensor 142 can allow the processor 134 to determine if the book 10 is open or closed and the processor 134 may operate in different modes depending if the book 10 is open or closed.

Figure 9:
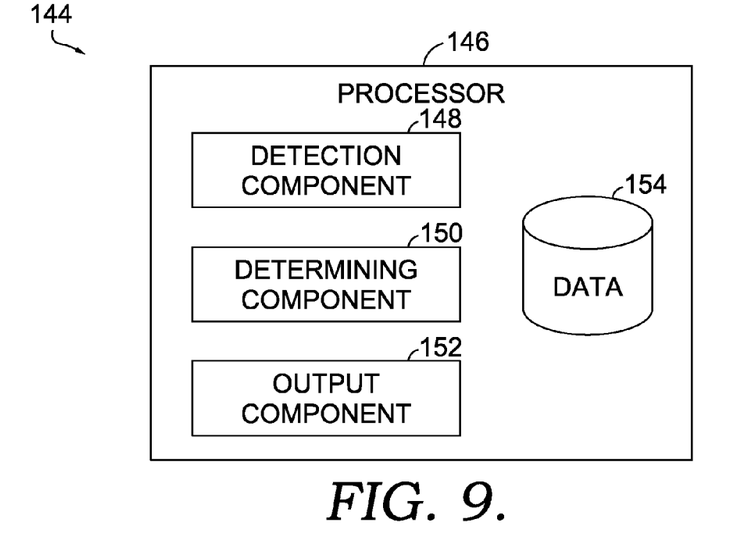
FIG. 9 is a system diagram of a processor for use with a capacitive gesture recognition book, in accordance with an embodiment of the present invention.

Turning now to FIG. 9, a system diagram of a processor for use with a capacitive gesture recognition book. A system component 144 includes a processor 146 having a detection component 148, a determining component 150, an output component 152 and a data component 154. The detection component 148 is configured to receive at least one indication of a change in capacitance based on monitoring by at least one capacitive sensor. Upon the processor 146 receiving the indication of a change in capacitance detected by one or more of the capacitive sensors, the determining component 150 associates the at least one indication of change in capacitance with at least one touch sequence stored in the database 154. The stored touch sequence is associated with an audio file stored in the data 124. Upon associating the stored touch sequence with the corresponding audio file, the processor 146 initiates playback of the audio file via the output component 152.

Figure 10:
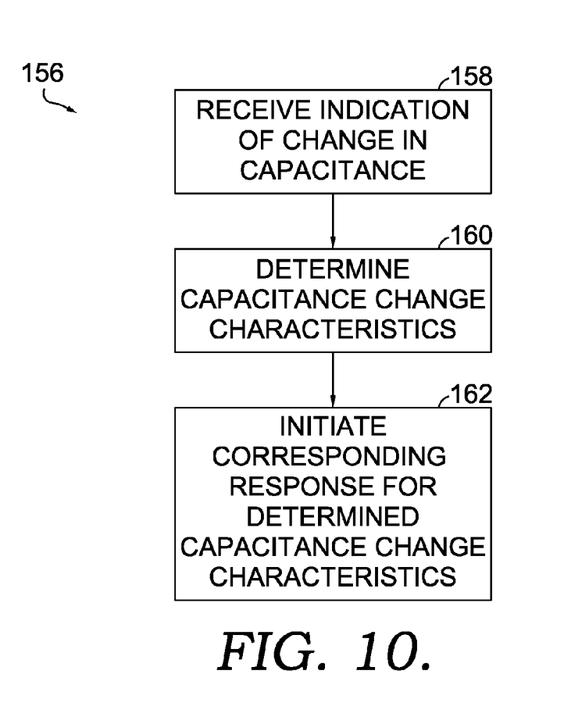
FIG. 10 is a flow diagram of a method of using the capacitive gesture recognition book, in accordance with an embodiment of the present invention.

FIG. 10 illustrates a flow diagram 156 of a method of using a capacitive gesture recognition book. The method includes, at step 158, receiving an indication of a detected change in capacitance. At step 160, a determination is made regarding the characteristics of the detected change in capacitance. A response is initiated, at step 160, that corresponds to the determined change characteristics of the detected change in capacitance.

Figure 11:
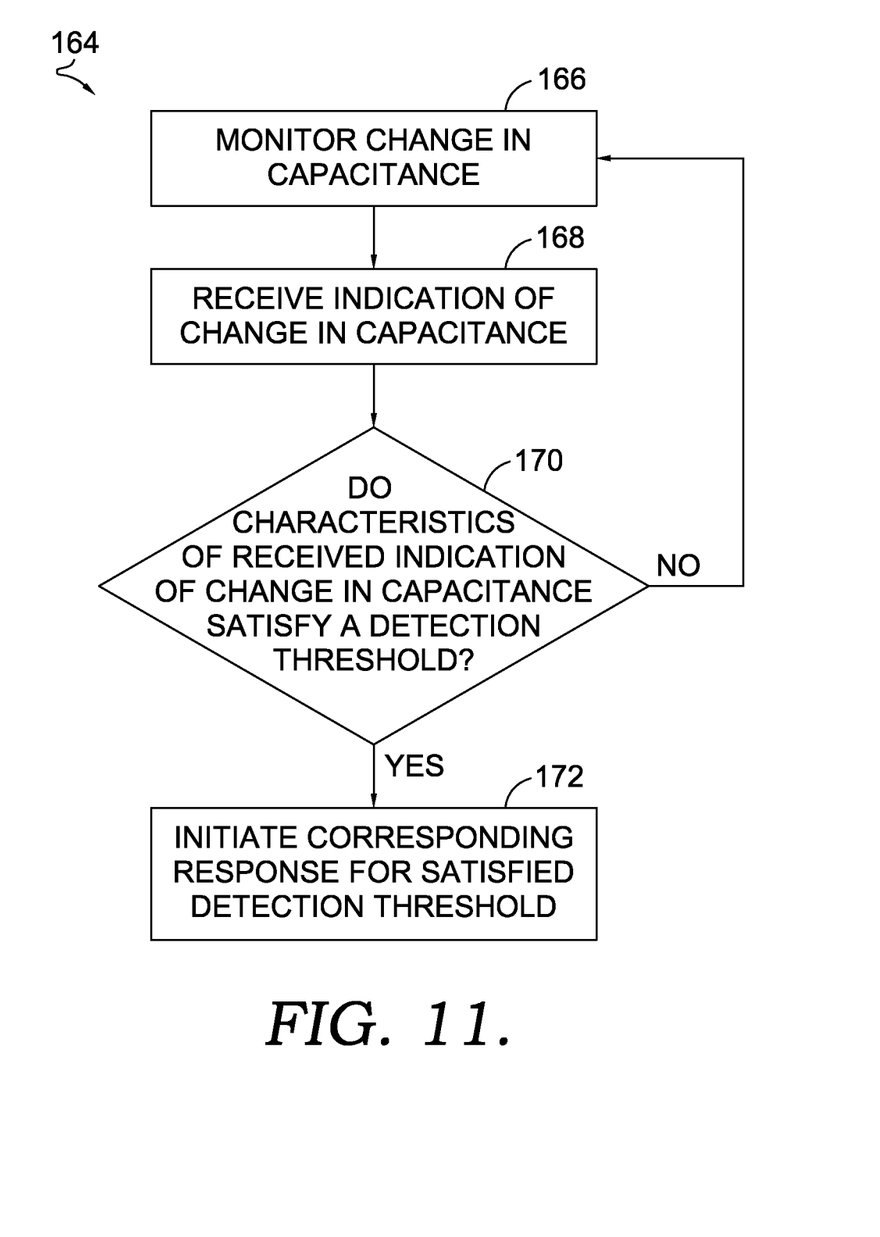
FIG. 11 is a flow diagram of capacitance monitoring during use of the capacitive gesture recognition book, in accordance with an embodiment of the present invention.

FIG. 11 is a flow diagram 164 which illustrates a method of capacitance monitoring during use of a capacitive gesture recognition book. At step 166, one or more areas of the book are monitored for a change in capacitance. Upon detection of one or more changes in capacitance, one or more indications of a change in capacitance are received at step 168. A determination is made, at decision 170, if the characteristics of a received indication of change in capacitance satisfy a detection threshold amount. If the characteristics of a received indication of change in capacitance satisfy a detection threshold amount, a corresponding response is initiated at step 172. If the characteristics of a received indication of change in capacitance do not satisfy a detection threshold amount, one or more areas of the book continue to be monitored for a change in capacitance at step 166.

Many variations can be made to the illustrated embodiment of the present invention without departing from the scope of the present invention. Such modifications are within the scope of the present invention. For example, while the response that is initiated upon detection of a particular stored capacitive sensor activation sequence has been identified as the playback of an audio file, other activations could be triggered, such as vibrations, activations of light, and/or activations of motion, alone or in combination with each other. Further, in addition to detected sequences activating response, single activations of capacitive sensors may be associated with various activations. Similarly, reverse activation of capacitive sensors may activate alternate responses. For example, activation of second, first, and third capacitive sensors 32, 30, and 50, respectively, might cause an audio file to be played where the sound gets higher in pitch, while activation of third, first, then second capacitive sensors might initiate playback of an audio file where the sound gets lower in pitch.

Further still, the processor 90 may include a timing component. The timing component may be used to associate different responses with the same capacitive activation sequences. For example, a fast swipe that causes activation of second, first, and third capacitive sensors 32, 30, and 50, respectively, might cause an audio file to be played where the sound is a fast motion, whereas a slow swipe activation of the same sensors in the same sequence might cause activation of an alternate audio file where the sound is a slower motion. Likewise, activation of each sensor might cause activation of a sound, such that the faster a following sensor is activated the faster the sound goes. As described above in connection with FIG. 2, slow circular motion would cause slow sounds while faster and faster activation of the sensors 30, 32 could cause faster and faster activation of sounds, making it, in essence, a live audio dependent on the rate at which the user activates the sensors 30, 32.

The timing component may also be a sensor time threshold component. This could be associated with a particular capacitive activation sequence to require activation of the sensors in the capacitive activation sequence to not only be activated in a particular order, but to be activated in a particular time. For example, activation of the first sensor 30 and then, three seconds later, activation of the second sensor 32 may not initiate playback of an audio file associated with activation of the first then the second sensors 30, 32 if the activation sequence also includes a maximum sensor time threshold component of one second or less.

Similarly, a minimum threshold time period may also be specified. This could prevent accidental activation of a response when capacitive sensors are activated in a particular capacitive activation sequence, but in a time period below a minimum threshold amount. For example, if a user brushes across a page quickly to turn it, a minimum threshold amount could be used to avoid accidental activation of a response. In that regard, particular capacitive activation sequences could have an activation window associated therewith to limit activation of a response to instances only where activation of the complete sequence only occurs in a time period that falls within the activation window associated therewith. In other words, completion of the activation sequence too quickly (e.g., less than one second) would not cause activation of a response, within the window (e.g., between a second and three seconds) would cause activation of a response, and too slowly (e.g., more than three seconds) would not cause activation of a response. It should also be noted that different gestures could have different time thresholds or activation windows. For example, a gesture that requires activation of only two capacitive sensors might have a window around half a second (e.g., 0.4-0.6 seconds), whereas a gesture that requires activation of three sensors might have a window around one and a half seconds (e.g., 1.3-1.7 seconds).

Lastly, while the embodiments described above and illustrated herewith disclose arrangements that are not page specific (i.e., the same gesture causes activation of the same response whether the book is open to page 1 (spread one) or page 15 (spread eight)), incorporation of a page detection method could be used to increase number of responses available for each page. For example, using the same number of capacitive sensors, a non-page specific gesture recognition book might be able to detect 30 particular capacitive activation sequences, whereas a gesture recognition book that can determine which page or spread it is open to could increase the number of available responses to 30 particular capacitive activation sequences per page. This would allow movement from first capacitive sensor 30 to second capacitive sensor 32 on spread one to activate sound #1 and movement from first capacitive sensor 30 to second capacitive sensor 32 on spread two to activate sound #2.

As can be seen, the use of capacitive sensors hidden in a back base is well suited to provide activation of various sounds in connection with an audio storybook. Unlike prior art audio storybooks with the buttons off to the side of the pages, the capacitive sensors can detect movement of a user's hand or finger through multiple pages of a book. Simple, common and inexpensive paper pages may be used, thereby eliminating the cost of pages that contain electronics therein. The sensors are hidden from view and can work with multiple pages. Desired activation sequences can be illustrated on the various pages to direct a user to move their finger across or above the page in a desired gesture that can be recognized and used to initiate a response that correlates with the images and/or storyline on the particular page.

From the foregoing it will be seen that this invention is one well adapted to attain all ends and objects hereinabove set forth together with the other advantages which are clear following the complete disclosure above and which are inherent to the methods and apparatuses described herein. It will be understood that certain features and subcombinations are of utility and may be employed without reference to other features and subcombinations. This is contemplated by and is within the scope of the invention and claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

The invention claimed is:

1. A capacitive gesture recognition book comprising:
   a book base having one or more processors, a plurality of capacitive sensors coupled to at least one of the one or more processors, at least one power supply coupled to at least one of the one or more processors, and at least one output component coupled to at least one of the one or more processors, wherein the one or more processors, the plurality of capacitive sensors, the at least one power supply, and the at least one output component are positioned within an internal compartment of the book base and respectively coupled therein; and
   a plurality of book pages coupled to the book base, positionable there above, and separated from the internal compartment, the plurality of book pages excluding electronics and having at least one book page comprising at least one page feature, the at least one page feature having at least one contact indicator directing user interaction with the at least one book page, wherein the at least one contact indicator corresponds to at least two of the plurality of capacitive sensors, and wherein interaction by a user with the at least book one page as directed by the at least one contact indicator causes a change in capacitance detectable by the two or more capacitive sensors that correspond with the at least one contact indicator.

2. The capacitive gesture recognition book of claim 1, wherein a first page of the plurality of book pages comprises a first page feature having a first contact indicator directing a first user interaction with the first page and comprising a starting point, a stopping point, and a path, the first contact indicator corresponding to a first touch sequence comprising at least two of the plurality of capacitive sensors,
   wherein a second page of the plurality of book pages comprises a second page feature having a second contact indicator directing a second user interaction with the second page that is different than the first user interaction, the second contact indicator corresponding to a second touch sequence comprising at least two of the plurality of capacitive sensors,
   wherein the first touch sequence is different from the second touch sequence, and
   wherein the capacitive gesture recognition book excludes electronic components exterior to the internal compartment of the book base.

3. The capacitive gesture recognition book of claim 2, wherein the first touch sequence comprises a sensor identity component and a sensor time threshold component.

4. The capacitive gesture recognition book of claim 2, wherein at least one capacitive sensor of the first touch sequence and at least one capacitive sensor of the second touch sequence is a same capacitive sensor.

5. The capacitive gesture recognition book of claim 2, wherein the path of the first contact indicator extends from the starting point to the stopping point, and wherein the first user interaction directed by the first contact indicator comprises a movement of the user's finger on or above the first page along the path from the starting point to the stopping point, whereby the movement by the user causes a first change in capacitance detectable by the at least two capacitive sensors of the first touch sequence.

6. The capacitive gesture recognition book of claim 5, wherein the first contact indicator further comprises an intermediate point between the starting point and the stopping point, wherein the path extends from the starting point to the intermediate point and from the intermediate point to the stopping point, and wherein the first user interaction directed by the first contact indicator comprises a movement of the user's finger on or above the first page along the path from the starting point to the intermediate point and from the intermediate point to the stopping point, whereby the movement by the user causes a first sequential change in capacitance detectable by each of the at least two capacitive sensors of the first touch sequence in a sequential order and within a threshold amount of time.

7. The capacitive gesture recognition book of claim 5, wherein the one more processors comprises a memory component having stored therein a first capacitive sensor activation sequence associated with the first touch sequence and a first audio file associated with the first capacitive sensor activation sequence, and wherein the one or more processors initiates playback of the first audio file upon detection of the first change in capacitance detectable by the at least two capacitive sensors of the first touch sequence.

8. The capacitive gesture recognition book of claim 7, wherein each of the plurality of book pages is non-conductive and configured to overlay the book base, and wherein movement by the user in the first touch sequence on or above any page of the plurality of book pages causes the first change in capacitance detectable by the at least two capacitive sensors of the first touch sequence.

9. An interactive, non-page specific gesture recognition book comprising:
   a book base comprising an internal compartment;
   two or more book pages coupled to the book base and positioned exterior to the internal compartment, said two or more book pages excluding electronics; and
   a processor positioned within the internal compartment of the book base and configured to operate the interactive, non-page specific gesture recognition book, said processor comprising:
   a memory component configured to store therein at least one touch sequence and a corresponding response associated with the at least one touch sequence,
   a detection component configured to receive two or more indications of change in capacitance based on monitoring by at least two capacitive sensors positioned within the internal compartment of the book base,
   a determining component configured to associate the two or more indications of change in capacitance with the at least one touch sequence, and
   an output component configured to initiate the corresponding response associated with the at least one touch sequence.

10. The interactive, non-page specific gesture recognition book of claim 9, wherein each of the two or more book pages is non-conductive paper and further wherein a first book page of the two or more book pages is positionable over at least a portion of the book base.

11. The interactive, non-page specific gesture recognition book of claim 9, wherein each of the two or more book pages is non-conductive paper, and further wherein a first book page of the two or more book pages comprises at least one page feature, wherein the at least one page feature corresponds to at least one touch sequence for the first book page.

12. The interactive, non-page specific gesture recognition book of claim 11, wherein the at least one touch sequence for the first book page comprises a sequence of detected changes in capacitance received by the at least two capacitive sensors.

13. The interactive, non-page specific gesture recognition book of claim 9, wherein the memory component is further configured to store therein a first touch sequence, a first corresponding response associated with the first touch sequence, a second touch sequence, and a second corresponding response associated with the second touch sequence.

14. The interactive, non-page specific gesture recognition book of claim 13, wherein the detection component is further configured to receive a first plurality of indications of change in capacitance based on monitoring by a plurality of capacitive sensors, wherein the plurality of capacitive sensors are configured to detect one or more changes in capacitance corresponding to the first plurality of indications of change in capacitance about a top surface of any of the two or more book pages.

15. The interactive, non-page specific gesture recognition book of claim 14, wherein the determining component is further configured to associate the first plurality of indications of change in capacitance with the first touch sequence.

16. The interactive, non-page specific gesture recognition book of claim 15, wherein the detection component is further configured to receive a second plurality of indications of change in capacitance based on monitoring by the plurality of capacitive sensors, wherein the plurality of capacitive sensors are configured to detect one or more changes in capacitance corresponding to the second plurality of indications of change in capacitance about the top surface of any of the two or more book pages,
and further wherein the determining component is further configured to associate the second plurality of indications of change in capacitance with the second touch sequence,
wherein the first touch sequence is different than the second touch sequence,
and further wherein the output component is configured to initiate the first corresponding response associated with the first touch sequence and the second corresponding response associated with the second touch sequence, wherein the first corresponding response and the second corresponding response are different.

17. The interactive, non-page specific gesture recognition book of claim 16, wherein the output component comprises a speaker, wherein the first corresponding response comprises a first audible response and the second corresponding response comprises a second audible response, wherein the processor is configured to initiate playback of the first audible response in association with the first touch sequence and to initiate playback of the second audible response in association with the second touch sequence, and wherein the speaker is configured to play the first audible response and the second audible response.

18. The interactive, non-page specific gesture recognition book of claim 9, wherein the processor is configured to identify a first instance of the at least one touch sequence and a second instance of the at least one touch sequence, wherein the output component is configured to initiate a first instance of the corresponding response associated with the at least one touch sequence and a second instance of the corresponding response associated with the at least one touch sequence,
and further wherein the interactive, non-page specific gesture recognition book excludes any electronic components exterior to the internal compartment or the book base.

19. A method for operating a capacitive gesture recognition book, the method comprising:
monitoring one or more areas above a plurality of pages of the capacitive gesture recognition book for two or more changes in capacitance;
detecting two or more changes in capacitance through the plurality of pages of the capacitive gesture recognition book;
receiving, at a first timepoint, indications of changes in capacitance within a specific amount of time with respect to a first page surface of a first page of the plurality of pages;
determining a first touch sequence associated with the received indications of changes in capacitance at the first timepoint by selecting from a set of stored touch sequences a touch sequence corresponding to the received indication of changes in capacitance at the first timepoint; and
initiating a response corresponding to the determined first touch sequence, wherein the initiated response comprises playing of at least a portion of a first audible recording stored in association with the first touch sequence.

20. The method of claim 19, further comprising:
monitoring the one or more areas for two or more changes in capacitance;
detecting two or more changes in capacitance through the plurality of pages;
receiving, at a second timepoint different than the first timepoint, indications of changes in capacitance within a specific threshold amount of time with respect to a second page surface of a second page of the plurality of pages;
determining a second touch sequence associated with the received indications of change in capacitance at the second timepoint by selecting from the set of stored touch sequences a touch sequence corresponding to the received indications of changes in capacitance at the second timepoint; and
initiating a response corresponding to the determined second touch sequence, wherein the initiated response comprises playing of at least a portion of a second audible recording stored in association with the second touch sequence.

* * * * *

UNITED STATES PATENT AND TRADEMARK OFFICE
CERTIFICATE OF CORRECTION

PATENT NO. : 10,643,484 B2  
APPLICATION NO. : 14/516132  
DATED : May 5, 2020  
INVENTOR(S) : Mathew Long Nguyen Page 1 of 1

It is certified that error appears in the above-identified patent and that said Letters Patent is hereby corrected as shown below:

In the Claims  
Claim 1, Column 9, Line 25: "book one" should read --one book--.

Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*